US008689043B1

(12) United States Patent
Bezbaruah et al.

(10) Patent No.: US 8,689,043 B1
(45) Date of Patent: *Apr. 1, 2014

(54) FAST FAILOVER WITH MULTIPLE SECONDARY NODES

(75) Inventors: Angshuman Bezbaruah, Range Hills (IN); Anand A. Kekre, Baner (IN); Niranjan S. Pendharkar, Maharashtra (IN)

(73) Assignee: Symantec Operating Corporation, Mountain View, CA (US)

( * ) Notice: Subject to any disclaimer, the term of this patent is extended or adjusted under 35 U.S.C. 154(b) by 2201 days.

This patent is subject to a terminal disclaimer.

(21) Appl. No.: 10/610,139

(22) Filed: Jun. 30, 2003

(51) Int. Cl.
*G06F 12/00* (2006.01)
*G06F 13/00* (2006.01)
*G06F 13/28* (2006.01)
*G06F 11/00* (2006.01)
*G06F 11/16* (2006.01)

(52) U.S. Cl.
USPC ............................ 714/6.3; 711/162; 714/4.11

(58) Field of Classification Search
USPC .............. 711/148, 162–165; 714/4, 4.11, 6.3, 714/6.32
See application file for complete search history.

(56) References Cited

U.S. PATENT DOCUMENTS

| 6,834,326 | B1 * | 12/2004 | Wang et al. | 711/114 |
|---|---|---|---|---|
| 2003/0051187 | A1 * | 3/2003 | Mashayekhi et al. | 714/4 |
| 2003/0126387 | A1 * | 7/2003 | Watanabe | 711/161 |
| 2003/0145179 | A1 * | 7/2003 | Gabber et al. | 711/162 |

OTHER PUBLICATIONS

Apple Computer, Introduction to SCSI Concepts, Jul. 1996, http://developer.apple.com/documentation/mac/Devices/Devices-120.html, pp. 1-5.*
Wikipedia,Counter,retrieved from http://en.wikipedia.org/wiki/Counter on Jan. 29, 2009, 4 pages.*

* cited by examiner

*Primary Examiner* — April Y Blair
*Assistant Examiner* — Gary W Cygiel
(74) *Attorney, Agent, or Firm* — Campbell Stephenson LLP

(57) ABSTRACT

A method, system, computer system, and computer program product to quickly synchronize replicas of data stored at multiple secondary nodes upon failure of a primary node. Secondary nodes to which an update to data in a region of a storage area is sent are identified. When all of the secondary nodes have acknowledged the update, a notification is sent to each of the secondary nodes. Respective indicator(s) (e.g., "outstanding update" or "out of sync" indicators) can be set to indicate that the data have changed in respective region(s) at one of the secondary nodes when the update has been received at that secondary node. The indicator(s) can be reset for the respective region(s) when the notification sent by the primary node is received at the secondary node. Data in the region(s) can be synchronized with data at secondary nodes when either node has an indicator set for that region.

27 Claims, 11 Drawing Sheets

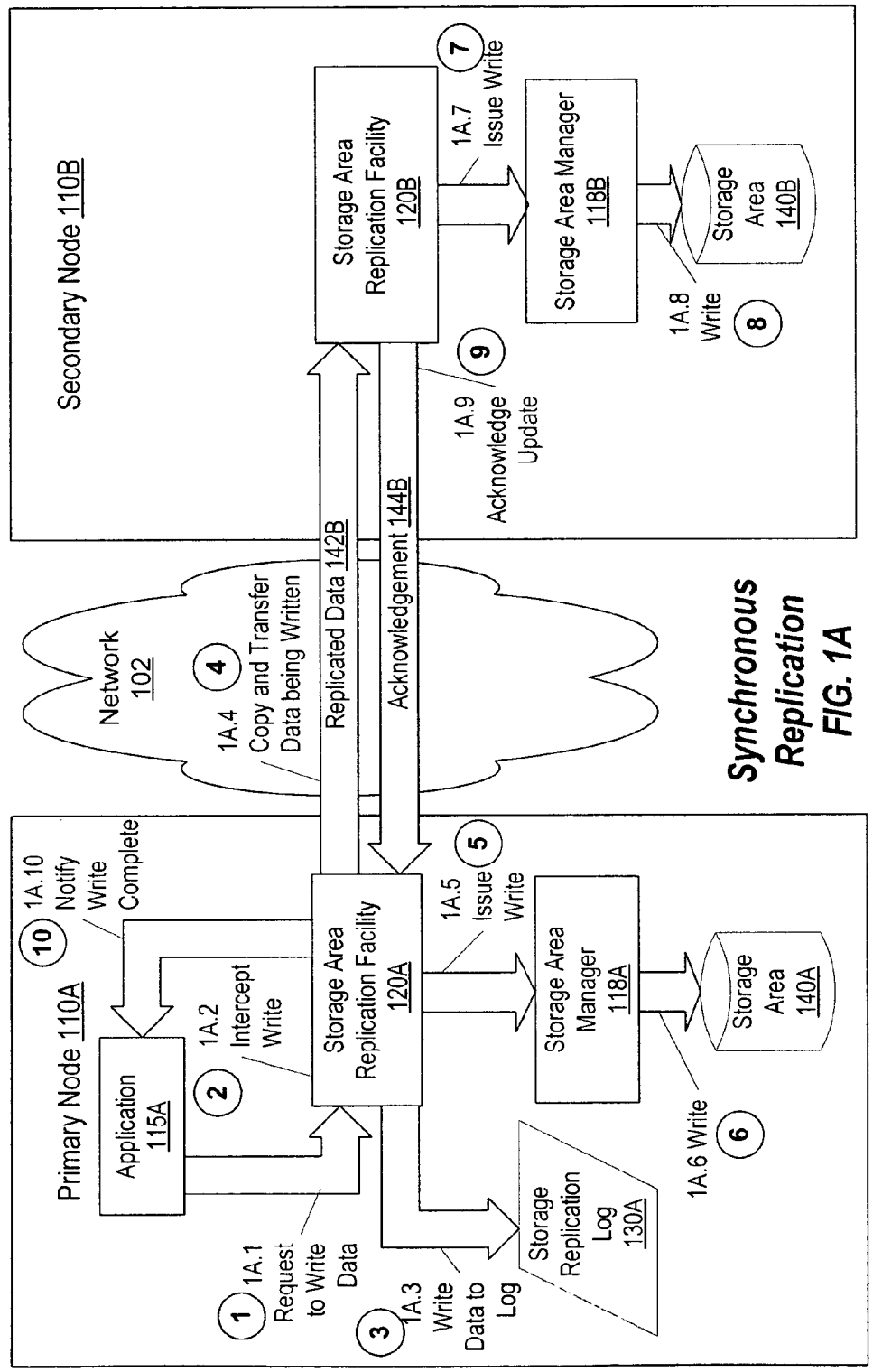

Asynchronous Replication

*Simultaneous Asynchronous and Synchronous Replication*

*Periodic Replication*

*Simultaneous Continuous and Non-Continuous Replication*

| Event | Volume P | R1 Counter | Volume S1 | Volume S1 map | Volume S2 | Volume S2 map | Volume S3 | Volume S3 map |
|---|---|---|---|---|---|---|---|---|
| 2.1 Begin | --- | | | 00000000 | | 00000000 | | 00000000 |
| 2.2 Write R1=A to log | --- | | --- | 00000000 | --- | 00000000 | --- | 00000000 |
| 2.3 Provide R1=A to S1, S2, S3 | --- | 3 | --- | 00000000 | --- | 00000000 | --- | 00000000 |
| 2.4 S1 Receives R1=A | --- | 3 | A | 10000000 | --- | 00000000 | --- | 00000000 |
| 2.5 S1 Acknowledges R1=A and R1 Count updated | --- | 2 | A | 10000000 | --- | 00000000 | --- | 00000000 |
| 2.6 Notify write complete | --- | 2 | A | 10000000 | --- | 00000000 | --- | 00000000 |
| 2.7 Write R1=A to primary Volume P | A | 2 | A | 10000000 | --- | 00000000 | --- | 00000000 |
| 2.8 Write R1=B to log | A | 2 | A | 10000000 | --- | 00000000 | --- | 00000000 |
| 2.9 Provide R1=B to S1, S2, S3 | A | 5 | A | 10000000 | --- | 00000000 | --- | 00000000 |
| 2.10 S1 Receives R1=B | A | 5 | B | 10000000 | --- | 00000000 | --- | 00000000 |

*FIG. 2A*

| Event | Volume P | R1 Counter | Volume S1 | Volume S1 map | Volume S2 | Volume S2 map | Volume S3 | Volume S3 map |
|---|---|---|---|---|---|---|---|---|
| 2.11 S1 Acknowledges R1=B, R1 Count updated | B_ _ _ _ | 4 | B_ _ _ _ | 10000000 | _ _ _ _ | 00000000 | _ _ _ _ | 00000000 |
| 2.12 Notify write complete | B_ _ _ _ | 4 | B_ _ _ _ | 10000000 | _ _ _ _ | 00000000 | _ _ _ _ | 00000000 |
| 2.13 S2, S3 Recv R1=A | B_ _ _ _ | 4 | B_ _ _ _ | 10000000 | A_ _ _ _ | 10000000 | A_ _ _ _ | 10000000 |
| 2.14 S2 Acknowledges R1=A, R1 Count updated | B_ _ _ _ | 3 | B_ _ _ _ | 10000000 | A_ _ _ _ | 10000000 | A_ _ _ _ | 10000000 |
| 2.15 S3 Acknowledges R1=A, R1 Count updated | B_ _ _ _ | 2 | B_ _ _ _ | 10000000 | A_ _ _ _ | 10000000 | A_ _ _ _ | 10000000 |
| 2.16 S2, S3 Rcv R1=B | B_ _ _ _ | 2 | B_ _ _ _ | 10000000 | B_ _ _ _ | 10000000 | B_ _ _ _ | 10000000 |
| 2.17 S2 Acknowledges R1=B and R1 Count updated | B_ _ _ _ | 1 | B_ _ _ _ | 10000000 | B_ _ _ _ | 10000000 | B_ _ _ _ | 10000000 |
| 2.18 S3 Acknowledges R1=B and R1 Count updated | B_ _ _ _ | 0 | B_ _ _ _ | 10000000 | B_ _ _ _ | 10000000 | B_ _ _ _ | 10000000 |
| 2.19 Notify Nodes to Clear Bit for R1 | B_ _ _ _ | | B_ _ _ _ | 10000000 | B_ _ _ _ | 10000000 | B_ _ _ _ | 10000000 |
| 2.20 Clr Bits | B_ _ _ _ | | B_ _ _ _ | 00000000 | B_ _ _ _ | 00000000 | B_ _ _ _ | 00000000 |

*FIG. 2B*

| Event | Vol P | S1 R1 Sent | S1 R1 Rcd | S2 R1 Sent | S2 R1 Rcd | S3 R1 Sent | S3 R1 Rcd | Vol S1 | Vol S1 map | Vol S2 | Vol S2 map | Vol S3 | Vol S3 map |
|---|---|---|---|---|---|---|---|---|---|---|---|---|---|
| 4.1 Begin | | 0 | 0 | 0 | 0 | 0 | 0 | | 0000 | | 0000 | | 0000 |
| 4.2 Write R1=A | A | 0 | 0 | 0 | 0 | 0 | 0 | --- | 0000 | --- | 0000 | --- | 0000 |
| 4.3 Send R1=A to S1 | A | 1 | 0 | 0 | 0 | 0 | 0 | --- | 0000 | --- | 0000 | --- | 0000 |
| 4.4 S1 rcvs Update R1=A | A | 1 | 0 | 0 | 0 | 0 | 0 | A | 1000 | --- | 0000 | --- | 0000 |
| 4.5 S1 Acknowledge R1=A, P Updates R1 maps | A | 1 | 1 | 0 | 0 | 0 | 0 | A | 1000 | | | | |
| 4.6 Write R1=B | B | 1 | 1 | 0 | 0 | 0 | 0 | A | 1000 | --- | 0000 | --- | 0000 |
| 4.7 Send Update R1=B to S1, S2, S3 | B | 1 | 0 | 1 | 0 | 1 | 0 | A | 1000 | --- | 0000 | --- | 0000 |
| 4.8 S1, S2, S3 receive Update R1=B | B | 1 | 0 | 1 | 0 | 1 | 0 | B | 1000 | B | 1000 | B | 1000 |
| 4.9 S1, S2, S3 acknowledge R1=B | B | 1 | 1 | 1 | 1 | 1 | 1 | B | 1000 | B | 1000 | B | 1000 |
| 4.10 Notify All Nodes R1 in sync | B | 0 | 0 | 0 | 0 | 0 | 0 | B | 1000 | B | 1000 | B | 1000 |
| 4.11 Nodes Clear R1 Bits | B | 0 | 0 | 0 | 0 | 0 | 0 | B | 0000 | B | 0000 | B | 0000 |

FIG. 4

| Event | Vol P | S1 R1 Sent | S1 R1 Rcd | S2 R1 Sent | S2 R1 Rcd | S3 R1 Sent | S3 R1 Rcd | Vol S1 | Vol S1 map | Vol S2 | Vol S2 map | Vol S3 | Vol S3 map |
|---|---|---|---|---|---|---|---|---|---|---|---|---|---|
| 5.1 Begin | | 0 | 0 | 0 | 0 | 0 | 0 | | 0000 | | 0000 | | 0000 |
| 5.2 Write R1=A | A___ | 0 | 0 | 0 | 0 | 0 | 0 | ___ | 0000 | ___ | 0000 | ___ | 0000 |
| 5.3 Send R1=A S1, S2 | A___ | 1 | 0 | 1 | 0 | 0 | 0 | | 0000 | | 0000 | | 0000 |
| 5.4 S1 rcvs Update R1=A | A___ | 1 | 1 | 1 | 0 | 0 | 0 | A___ | 1000 | ___ | 0000 | ___ | 0000 |
| 5.5 S1 Ack | A___ | 1 | 1 | 1 | 0 | 0 | 0 | A___ | 1000 | ___ | 0000 | ___ | 0000 |
| 5.6 Update R1 ctrs | A___ | 1 | 1 | 1 | 0 | 0 | 0 | A___ | 1000 | ___ | 0000 | ___ | 0000 |
| 5.7 Write R1=B | B___ | 1 | 1 | 1 | 0 | 0 | 0 | A___ | 1000 | ___ | 0000 | ___ | 0000 |
| 5.8 Send Update R1=B to S1, S2, S3 | B___ | 2 | 1 | 2 | 0 | 1 | 0 | A___ | 1000 | ___ | 0000 | ___ | 0000 |
| 5.9 S1, S2, rcv R1=B | B___ | 2 | 1 | 2 | 1 | 1 | 0 | B___ | 1000 | B___ | 1000 | ___ | 0000 |
| 5.10 S2 ack R1=A | B___ | 2 | 1 | 2 | 1 | 1 | 0 | B___ | 1000 | B___ | 1000 | ___ | 0000 |
| 5.11 S3 rcv R1=B | B___ | 2 | 2 | 2 | 2 | 1 | 1 | B___ | 1000 | B___ | 1000 | B___ | 1000 |
| 5.12 S1, S2, S3 ack R1=B | B___ | 0 | 0 | 0 | 0 | 0 | 0 | B___ | 1000 | B___ | 1000 | B___ | 1000 |
| 5.13 Notify All Nodes R1 in sync | B___ | 0 | 0 | 0 | 0 | 0 | 0 | B___ | 0000 | B___ | 1000 | B___ | 1000 |
| 5.14 Nodes Clear R1 Bits | B___ | | | | | | | B___ | 0000 | B___ | 0000 | B___ | 0000 |

FIG. 5

FAST FAILOVER WITH MULTIPLE SECONDARY NODES

Portions of this patent application contain materials that are subject to copyright protection. The copyright owner has no objection to the facsimile reproduction by anyone of the patent document, or the patent disclosure, as it appears in the Patent and Trademark Office file or records, but otherwise reserves all copyright rights whatsoever.

BACKGROUND OF THE INVENTION

1. Field of the Invention

The present invention relates to quickly enabling one of several secondary nodes to provide the functionality of a failed primary node while maintaining data consistency on all nodes.

2. Description of the Related Art

Information drives business. A disaster affecting a data center can cause days or even weeks of unplanned downtime and data loss that could threaten an organization's productivity. For businesses that increasingly depend on data and information for their day-to-day operations, this unplanned downtime can also hurt their reputations and bottom lines. Businesses are becoming increasingly aware of these costs and are taking measures to plan for and recover from disasters.

Two areas of concern when a failure occurs, as well as during the subsequent recovery, are preventing data loss and maintaining data consistency between primary and secondary storage areas. One strategy includes replicating data from local computer systems to backup local computer systems and/or to computer systems at remote sites. Because disk storage volumes are common types of storage areas that are replicated, the term "storage area" is used interchangeably with "storage volume;" however, one of skill in the art will recognize that the replication processes described herein are also applicable to other types of storage areas and that the use of the term "storage volume" is not intended to be limiting.

Storage area replication is used to maintain online duplicate copies of some storage areas, such as disk volumes. The original storage area is called the primary, and the duplicate is called the replica. Replication tries to ensure that the secondary volume contains the same data, block by block, as in the primary volume, while the primary volume is in active use. The replica server and primary server may communicate over a network channel.

To accommodate the variety of business needs, some replication facilities provide remote mirroring of data and replicating data over a wide area or distributed network such as the Internet. However, different types of storage typically require different replication methods. Replication facilities are available for a variety of storage solutions, such as database replication products and file system replication products, although typically a different replication facility is required for each type of storage solution. Other replication facilities are available for replicating all contents of a particular type of storage device.

In case of failure of a server maintaining the primary storage area, applications using the primary storage area can be moved to a replica server under control of external "failover" software; this process is also referred to as a "failover." Preferably, failover is performed as quickly as possible to ensure high availability of enterprise data and continued functionality of enterprise systems.

Replication facilities provide such functionality as enabling a primary and secondary node to reverse roles when both are functioning properly. Reversing roles involves such replication operations as stopping the application controlling the replicated data, demoting the primary node to a secondary node, promoting the original secondary node to a primary node, and re-starting the application at the new primary node. Another example of functionality of a replication facility involves determining when a primary node is down, promoting the secondary node to a primary node, enabling transaction logging and starting the application that controls the replicated data on the new primary node. In addition, when the former primary node recovers from failure, the replication facility can prevent the application from starting at the former primary node since the application is already running at the newly-promoted node, the former secondary node. The transaction log can be used to synchronize data at the former and new primary nodes.

Replication of data can be performed synchronously, asynchronously, or periodically. With synchronous replication, an update is posted to the secondary node and acknowledged to the primary node before notifying the initiating application at the primary node that the update is complete. In the event of a disaster at the primary node, data can be recovered from the secondary node without any loss of data because the copies of the data at the primary and secondary nodes contain the same data. However, synchronous replication of data can be unacceptably slow in many enterprises with large amounts of data, very busy networks, and/or networks with high communication overhead due to long distances between nodes.

With asynchronous replication, updates to data are immediately reflected at the primary node and are queued to be forwarded to each secondary node. The initiating application is notified that the update is complete when the update is written to a storage location at the primary node. Data at the secondary node differs from data at the primary node during the period of time in which a change to the data is being transferred from the primary node to the secondary node. A decision regarding whether to replicate data synchronously or asynchronously depends upon the nature of the application program using the data as well as numerous other factors, such as available bandwidth, network round-trip time, the number of participating servers, and the amount of data to be replicated.

Under normal circumstances, updates, also referred to herein as writes, are sent to the secondary node in the order in which they are generated at the primary node when replication is performed asynchronously or synchronously. Consequently, the secondary node represents a state of the primary node at a given point in time. If a secondary node takes over due to a disaster, the data storage areas on the secondary nodes can be synchronized to be consistent.

Another method of replication is to replicate copies of data periodically, rather than copying the result of each update transaction. Periodic replication is in contrast to asynchronous and synchronous replication, which continuously replicate data. In periodic replication, changed data resulting from groups of update transactions are transmitted at a fixed time interval or based upon the occurrence of an event. To avoid copying the entire data volume each time, "snapshots" of the data volume are taken and regions containing data changed are tracked. Only the regions of data changed after the snapshot was taken are transmitted to the secondary node.

A replica that faithfully mirrors the primary currently is said to be synchronized or "in sync;" otherwise, the replica is said to be unsynchronized, or "out of sync." An out of sync replica may be synchronized by selectively or completely copying certain blocks from the primary; this process is called synchronization or resynchronization.

Whether synchronous, asynchronous, or periodic replication is used, volume replication software can begin to work only after an initial set-up phase where the replica is synchronized with the primary volume. A volume replication facility is set up to prepare a replica of a primary storage volume. Another storage volume, of the same capacity as the primary storage volume, is configured on a separate server. Data are copied from the primary storage volume to the replica storage volume via a communication network between the primary and replication server. Initial synchronization of two storage areas can be a time consuming process, especially for large volumes or slow networks.

After initial replica synchronization, a subsequent write operation being performed on the primary volume can be copied by the replication facility while the subsequent write operation is being performed. A copy of the data being written is sent over the network to be written to the replica volume. This process keeps the primary and the replica volume synchronized as closely as possible. However, problems such as network connectivity failure or host failure may cause the replica volume to become unsynchronized. In such a case, the primary volume and replica volume must be resynchronized.

In some business-critical environments, multiple replicas are maintained on multiple secondary nodes because of the need for high availability of the software and/or data. To ensure data consistency upon primary node failure, data on the secondary nodes must be synchronized before restarting an application managing the data. Because of the uncertainty of the state of the secondary nodes, often one of the secondary nodes is selected as having the "correct" data, and data are copied from the selected secondary node to the other secondary nodes. Unfortunately, synchronization is often performed by copying all blocks of the "correct" data to the other secondary nodes. Only when the synchronization is complete can the failover process be completed.

What is needed is a solution that enables a secondary node to assume the role of a failed primary node with as little effect on performance as possible. The solution should enable data on multiple secondary nodes to be quickly synchronized across a network or locally so that functionality and data provided by the failed primary node can be resumed as quickly as possible.

SUMMARY OF THE INVENTION

The present invention includes a method, system, computer program product, and computer system that quickly synchronize replicas of data stored at multiple secondary nodes upon failure of a primary node. In one embodiment, the method includes identifying secondary nodes to which an update to data in a region of a storage area is sent. When all of the secondary nodes have acknowledged the update, a notification is sent to each of the secondary nodes.

The method may further include setting respective indicator(s) (e.g., "outstanding update" or "out of sync" indicators) to indicate that the data have changed in a respective region at one of the secondary nodes when the update has been received at that secondary node. A resetting module may reset the indicator(s) for the respective region(s) when the notification sent by the primary node is received at the secondary node. The method may further include synchronizing data in the region with data at secondary nodes when either node has an indicator that is set. Synchronization may be performed upon primary node failure, at set intervals, or in response to a synchronization command.

BRIEF DESCRIPTION OF THE DRAWINGS

The present invention may be better understood, and its numerous objectives, features and advantages made apparent to those skilled in the art by referencing the accompanying drawings.

FIG. 1A is a diagram of a system for replicating data from a primary to a secondary node showing synchronous replication actions.

FIGS. 2A and 2B, collectively referred to as FIG. 2, show events performed when continuously (i.e., synchronously and/or asynchronously) replicating data to multiple secondary nodes in accordance with the present invention.

FIG. 4 shows another example of events performed when replicating data to multiple secondary nodes in accordance with one embodiment of the invention.

FIG. 5 shows another example of events performed when replicating data to multiple secondary nodes in accordance with one embodiment of the invention.

The use of the same reference symbols in different drawings indicates similar or identical items.

DETAILED DESCRIPTION

Figure 1B:
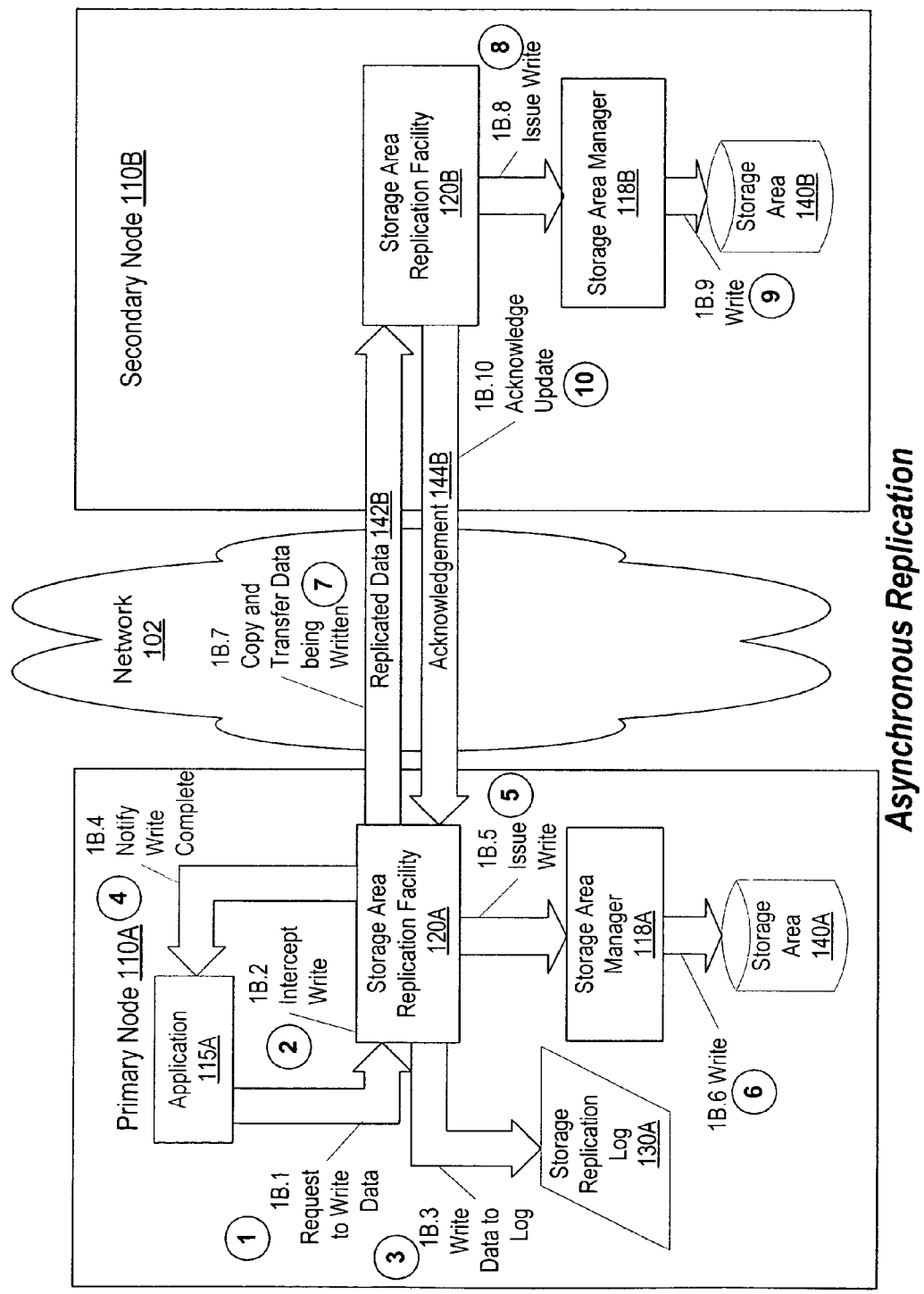
FIG. 1B shows asynchronous replication in the system of FIG. 1A.

For a thorough understanding of the subject invention, refer to the following Detailed Description, including the appended Claims, in connection with the above-described Drawings. Although the present invention is described in connection with several embodiments, the invention is not intended to be limited to the specific forms set forth herein. On the contrary, it is intended to cover such alternatives, modifications, and equivalents as can be reasonably included within the scope of the invention as defined by the appended Claims.

In the following description, for purposes of explanation, numerous specific details are set forth in order to provide a thorough understanding of the invention. It will be apparent, however, to one skilled in the art that the invention can be practiced without these specific details.

References in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

Introduction

The present invention includes a method, system, computer program product, and computer system that synchronize data maintained on multiple secondary nodes upon failure of a primary node.

In the environment described above, data from a primary node are replicated to maintain a consistent copy of data at a secondary node. Typically, a secondary node is remote from the physical location of the primary node and can be accessed via a network, although it is not a requirement that the secondary node be physically remote. Each of the primary and secondary nodes may be part of a cluster in which multiple computer systems are configured to serve either as an active node or a backup node for the cluster.

A given node can serve as a primary node for one application program, and a secondary node for another application program. Furthermore, for the same application program, a given node can serve as a secondary node at one point in time, and later as a primary node to "cascade" replication of the data to other nodes connected via communication links. For example, a first replication may be made between network nodes in different cities or states, and a node in one of the cities or states can serve as the primary node for replicating the data worldwide.

Each replication primary node can have more than one replication secondary node. As used herein, a reference to the secondary node implicitly refers to all secondary nodes associated with a given primary node because, typically, the same replication operations are performed on all secondary nodes.

Replication is unidirectional for a given set of data. Writes of data on the primary node are sent to the secondary nodes, but access to the data at the secondary nodes is typically read-only. If read/write access to a secondary set of data is required (after a primary node failure, for example), replication can be halted for that set of data or a snapshot of the secondary set of data can be made while continuing replication. If data are then written to storage areas on secondary nodes, a synchronization process can be performed when the primary node becomes available again so that both sets of data are again identical before resuming replication of data.

Application data should not be allowed to enter a state in which the failure of the network or the primary node would leave that application data in an inconsistent and unusable state. During normal operation, data loss can be prevented by logging all writes and ensuring that writes to the log are complete before attempting any writes to the primary and secondary data storage areas.

The unit of storage in a given storage area is referred to herein as a "block," as block terminology is typically used to describe units of storage of disk volumes. Again, one of skill in the art will recognize that the unit of storage can vary according to the type of storage area, and may be specified in units of bytes, ranges of bytes, files, or other types of storage objects. The use of the term "block" herein is not intended to be limiting and is used herein to refer generally to any type of storage object.

Some types of storage areas, such as disk volumes, store data as a set of blocks. Each block is typically of a fixed size; a block size of 512 bytes is commonly used. Thus, a volume of 1000 Megabyte capacity contains 2,048,000 blocks of 512 bytes each. Any of these blocks can be read from or written to by specifying the block number (also called the block address). Typically, a block must be read or written as a whole.

Data consistency is ensured by coordinating operations such that they occur in the same order on each secondary node as on the primary node. Consequently, data storage modifications occur in the same order on both the secondary and the primary node. If a primary or secondary node fails, recovery includes locating the last entry that had not yet been acknowledged by the secondary node as having been successfully written, before the failure. Operation can continue from that point. However, a set of requests may exist between the last acknowledged request and the last request that was sent to the replication storage area before the failure. The data changed in this set of requests may or may not have been written to the secondary node data storage areas.

If the primary node fails, some update and any log information on the primary node is lost, and generally the secondary node takes over as a primary node with data as it existed at an earlier point in time. However, if the primary node does not fail, but is unable to communicate with the secondary node due to failure of the network and/or of the secondary node, the primary node continues to log updates. In some situations, the primary node may also lock the addresses of all blocks or storage objects from which an acknowledgement was not received from the secondary node. Now the replica is out of sync, and the replica must be resynchronized using the logged data before normal copy-on-write replication can resume. If addresses of blocks or storage objects that were not acknowledged are not logged, a full synchronization must be performed.

FIG. 1A shows a detailed view of a configuration for replication management. Primary node 110A and secondary node 110B can be implemented as computer systems as are known in the art, including a processor (not shown) for executing instructions and a memory (not shown) for storing the instructions, as an integrated circuit (e.g., an FPGA (Field Programmable Gate Array) or ASIC (Application Specific Integrated Circuit) configured to perform the functionality of such instructions, or any mechanical device configured to perform such functions. Computer systems, including computer systems in the form of network appliances configured to perform tasks such as replication, are described in further detail with reference to FIG. 6 below.

Primary node 110A includes an application program 115A. Application program 115A can be a database, a file system, or a user-level application program. The present invention operates independently of the type of data and/or unit of storage of the data. Storage area manager 118A and storage area replication facility 120A obtain data to be written from application program 115A. Storage area replication facility 120A stores the data in storage area 140A via storage area manager 118A, which communicates directly with storage hardware for storage area 140A. It is within the scope of the invention that storage area 140A can include multiple storage objects, such as individual blocks making up a storage volume disk.

Secondary node 110B can include corresponding copies of application 115A (not shown). These respective copies can perform the functions of primary node 110A in the event of disaster, although none of these programs must be executing for performing replication or synchronization in accordance with the present invention. Alternatively, programs and other files associated with application, database and/or file system may be stored in a data storage area on the primary node and replicated along with the data. Should the secondary node itself need to manage the data, the programs and other files can be extracted from the replicated data and executed at the secondary node.

Corresponding copies of storage area manager 118A and storage area replication facility 120A also reside on secondary node 110B, respectively, storage area manager 118B and storage area replication facility 120B. These copies enable secondary node 110B to perform functions similar to those performed at primary node 110A and to manage storage areas and replicate data to other secondary nodes if necessary.

Shown in FIG. 1A are actions for a synchronous write operation. Action numbers for actions and sets of actions described in FIGS. 1A through 1E are provided as encircled text for the reader's convenience. Assume that data in storage area 140A on node 110A and storage area 140B on node 110B are initially synchronized. In action 1A.1, application 115A requests storage area manager 118A to write data. However, in action 1A.2, storage area replication facility 120A intercepts the write command on its way to storage area manager 118A. Storage area replication facility 120A writes the data to storage replication log 130A in action 1A.3. It is not required for operation of the invention that data are written to a storage replication log, although a storage replication log is valuable in assisting with recovery upon node failure. The data may be written directly to storage location 140A or into a memory buffer that is later copied to storage area 140A.

In action 1A.4, storage area replication facility 120A copies the data to be written by storage area manager 118A, referred to as replicated data 142B, and initiates a transfer of replicated data 142B to storage area 140B. In action 1A.5, storage area replication facility 120A asynchronously issues a write command to storage area manager 118A to write the data to storage area 140A. It is within the scope of the invention that writing data to a log, writing data to a local storage area, and sending data to a secondary node (respectively, actions 1A.3, 1A.4, and actions 1A.5) may start and/or complete in any order and may be performed in parallel. In some embodiments, it is preferable to complete writing data to the log before beginning to copy the data to secondary nodes; in other embodiments, for example, where a storage replication log is also used on secondary node 110B, action 1A.3 to write the data to the log can be performed in parallel.

In action 1A.6, storage area manager 118A writes the data to storage area 140A. Because the updated data resulting from the write operation is sent to a node that is updated synchronously, storage area replication facility 120A waits until an acknowledgement is received from storage area replication facility 120B before notifying application 115A that the write operation is complete.

Data transfer is typically performed over a communication link, such as network 102, between the primary and secondary nodes. Upon receiving replicated data 142B, in action 1A.7, storage area replication facility 120B on node 110B issues a write command to storage area manager 118B. In action 1A.8, storage area manager 118B writes the data directly to storage area 140B. In action 1A.9, storage area manager replication facility 120B sends acknowledgement 144B indicating that the update has been received on node 110B. Note that storage area replication facility 120B is not shown writing data to a log, such as storage replication log 130A of primary node 110A. However, it is within the scope of the invention that secondary nodes, such as secondary node 110B, may also write data to a log and/or memory buffer and acknowledge receipt of the data when the data are written to the log and/or memory buffer. In such a case, it is possible that the acknowledgement upon writing to data in the log and/or memory buffer in action 1A.9 may be performed in parallel with the write to the actual storage area 140B in actions 1A.7 and 1A.8. Furthermore, it is not necessary that write operation performed in actions 1A.5 and 1A.6 on primary node 110A be performed before the write operations performed in actions 1A.7 and 1A.8 on secondary node 110B; these operations may be performed in either order.

Upon receiving acknowledgement 144B, in action 1A.10, storage area replication facility 120A on node 110A notifies application 115A that the write operation is complete. The synchronous write operation is then complete with respect to secondary node 110B. As mentioned previously, synchronous replication includes actions similar to 1A.1 through 1A.10 for each secondary node when multiple secondary nodes exist.

Referring to FIG. 1B, asynchronous replication in the environment of FIG. 1A is shown. Again assume that the data in storage area 140A on node 110A and storage area 140B on node 110B are synchronized. In action 1B.1, application 115A requests storage area manager 118A to write data. In action 1B.2, storage area replication facility 120A intercepts the write command on its way to storage area manager 118A, and in action 1B.3, storage area replication facility 120A writes the data to storage replication log 130A. In action 1B.4, storage area replication facility 120A notifies application 115A that the write operation is complete. In contrast to FIG. 1A, this notification is sent without receiving an acknowledgement from storage area replication facility 120B because data are being replicated to secondary node 110B asynchronously. In action 1B.5, storage area replication facility 120A issues a write command to storage area manager 118A, and in action 1B.6, storage area manager 118A writes the updated data to storage area 140A. In action 1B.7, storage area replication facility 120A copies the data to be written by storage area manager 118A, referred to as replicated data 142B, and transfers replicated data 142B to storage area replication facility 120B on secondary node 110B.

As described with reference to FIG. 1A, it is within the scope of the invention that writing data to a log, initiating a write of data to a local storage area, and sending data to a secondary node (respectively, actions 1B.3, 1B.5, and actions 1B.6) may start and/or complete in any order and may be performed in parallel. It is necessary with asynchronous replication, however, that action 1B.3, writing data to a log, is performed before action 1B.4, notifying application 115A that the write operation is complete.

Upon receiving replicated data 142B, in action 1B.8, storage area replication facility 120B on node 110B issues a write command to storage area manager 118B. In action 1B.9, storage area manager 118B writes the updated data to storage area 140B. In action 1B.10, storage area replication facility 140B sends acknowledgement 144B to storage area replication facility 140A on node 110A. The asynchronous write operation is then complete with respect to secondary node 110B. As mentioned previously, replicated data 142B may instead be written to a log and/or memory buffer and acknowledged when the write operation to the log and/or memory buffer is completed. In addition, asynchronous replication includes actions similar to 1B.1 through 1B.10 for each secondary node when multiple secondary nodes exist.

Figure 1C:
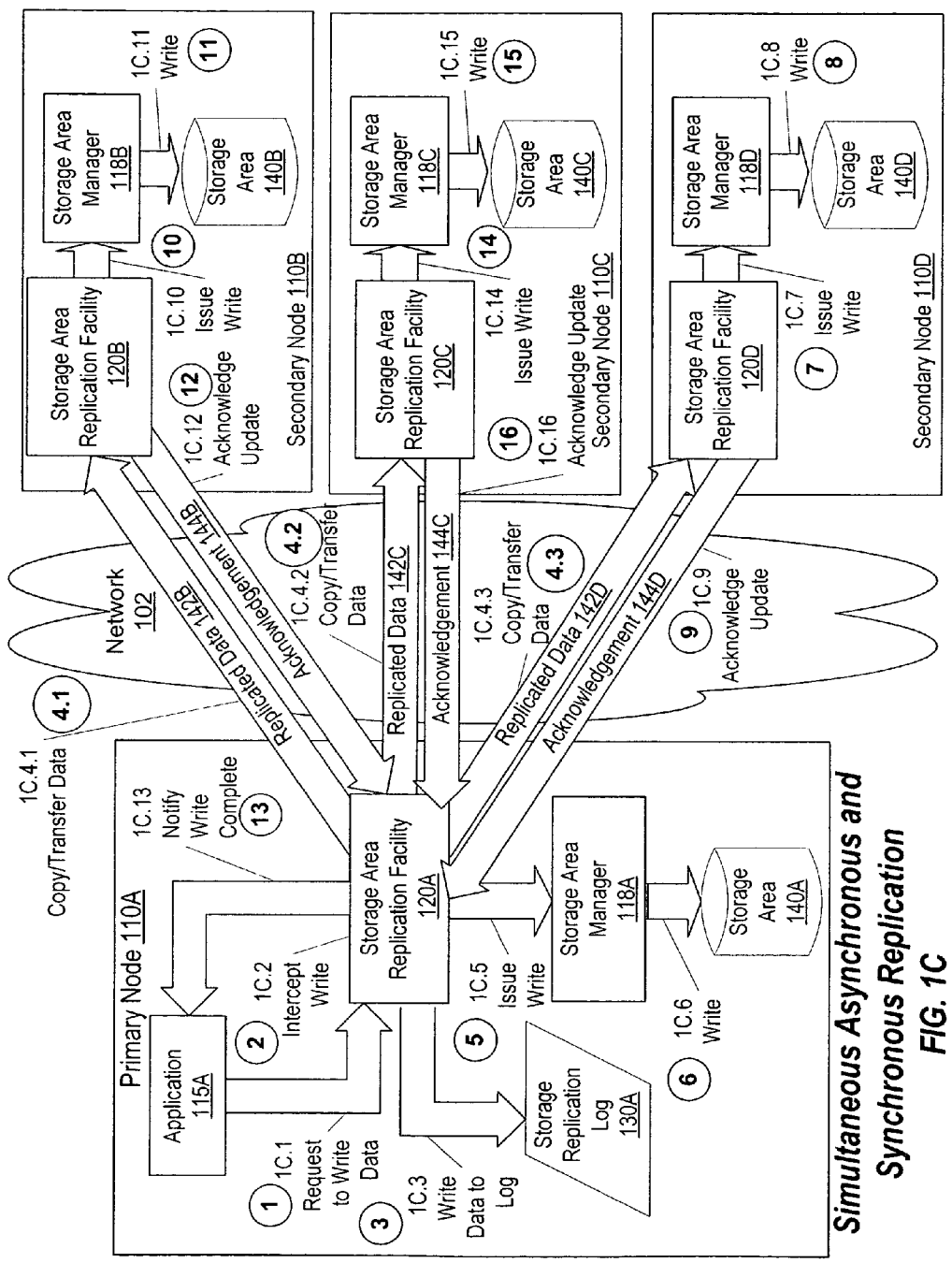
FIG. 1C shows simultaneous synchronous and asynchronous replication to multiple secondary nodes.

FIG. 1C shows replication to multiple secondary nodes simultaneously in the environment of FIG. 1A (now having two additional secondary nodes, 110C and 110D), with synchronous and asynchronous write operations occurring in parallel. Data are replicated to node 110B synchronously and to nodes 110C and 110D asynchronously. Assume that data in storage areas 140A, 140B, 140C, and 140D are initially synchronized. In action 1C.1, application 115A requests storage area manager 118A to write data. In action 1C.2, storage area replication facility 120A intercepts the write command on its way to storage area manager 118A. In action 1C.3, storage area replication facility 120A writes the update to storage replication log 130A. In actions 1C.4.1, 1C.4.2, and 1C.4.3, storage area replication facility 120A copies the data to be written by storage area manager 118A for each secondary node, referred to as replicated data 142B, 142C, and 142D, and initiates transfer to secondary nodes 110B, 110C and 110D. Because the write operation to node 110B is synchronous, storage area replication facility 120A waits until an acknowledgement is received from secondary node 110B before notifying application 115A that the write operation is complete.

In action 1C.5, storage area replication facility 120A on node 110A issues a write command to storage area manager 118A. In action 1C.6, storage area manager 118A writes the data to storage area 140A. Again, writing data to a log, initiating a write of the data to a local storage area, and sending data to a secondary node (respectively, actions 1C.3, 1C.5, and 1C.4.1, 1C.4.2, 1C.4.3) may start and/or complete in any order and may be performed in parallel.

Storage area replication facilities 120B, 120C, and 120D may receive the replicated data at different times depending upon network traffic between nodes. Therefore, secondary storage areas 140B, 140C, and 140D may be updated at different points in time and in any order.

In the example of FIG. 1C, secondary node 110D receives replicated data 142D first. Upon receiving replicated data 142D, in action 1C.7, storage area replication facility 120D on node 110D issues a write command to storage area manager 118D. In action 1C.8, storage area manager 118D writes the data to storage area 140D. In action 1C.9, storage area replication facility 120D sends acknowledgement 144D indicating that the replicated data 142D are received at secondary node 110D. The write operation is complete with regard to node 110D, but not with regard to secondary nodes 110B and 110C. Upon receiving acknowledgement 144D, storage area replication facility 120A on node 110A does not notify application 115A that the write operation is complete because storage area replication facility 120A is waiting for an acknowledgement from storage area replication facility 120B on secondary node 110B.

The example of FIG. 1C shows that storage area replication facility 120B on node 110B receives replicated data 142B next. Upon receiving replicated data 142B, in action 1C.10, storage area replication facility 120B on node 110B issues a write command to storage area manager 118B. In action 1C.11, storage area manager 118B writes the data to storage area 140B. In action 1C.12, storage area manager 118B sends acknowledgement 144B indicating that replicated data 142B are received at secondary node 110B. The synchronous write operation is then complete with respect to secondary node 110B, and in action 1C.13, storage area replication facility 120A on primary node 110A notifies application 115A that the write operation is complete.

In the example of FIG. 1C, secondary node 110C receives replicated data 142C next. Upon receiving replicated data 142C, in action 1C.14, storage area replication facility 120C on node 110C issues a write command to storage area manager 118C. In action 1C.15, storage area manager 118C writes the data to storage area 140C. In action 1C.16, storage area replication facility 120C sends acknowledgement 144C indicating that the write operation is complete on node 110C. The replicated data have been acknowledged by each of the three secondary nodes 110B, 110C, and 110D.

Assume that primary node 110A fails after the write operation in action 1C.8, when storage area 140D is updated but storage areas 140B, and 140C are not yet updated. As the most recently updated secondary node, node 110D has the current version of the data, but is unsynchronized with the other secondary nodes. Prior to the invention, a typical synchronization operation copied all blocks of one of the secondary storage areas to the other secondary storage areas so that the data are consistent before restarting application 115A managing the data on one of the former secondary nodes. However, block-by-block copying of every block can be very time consuming and bandwidth-intensive, and can delay resuming operations and waste resources.

Figure 1D:
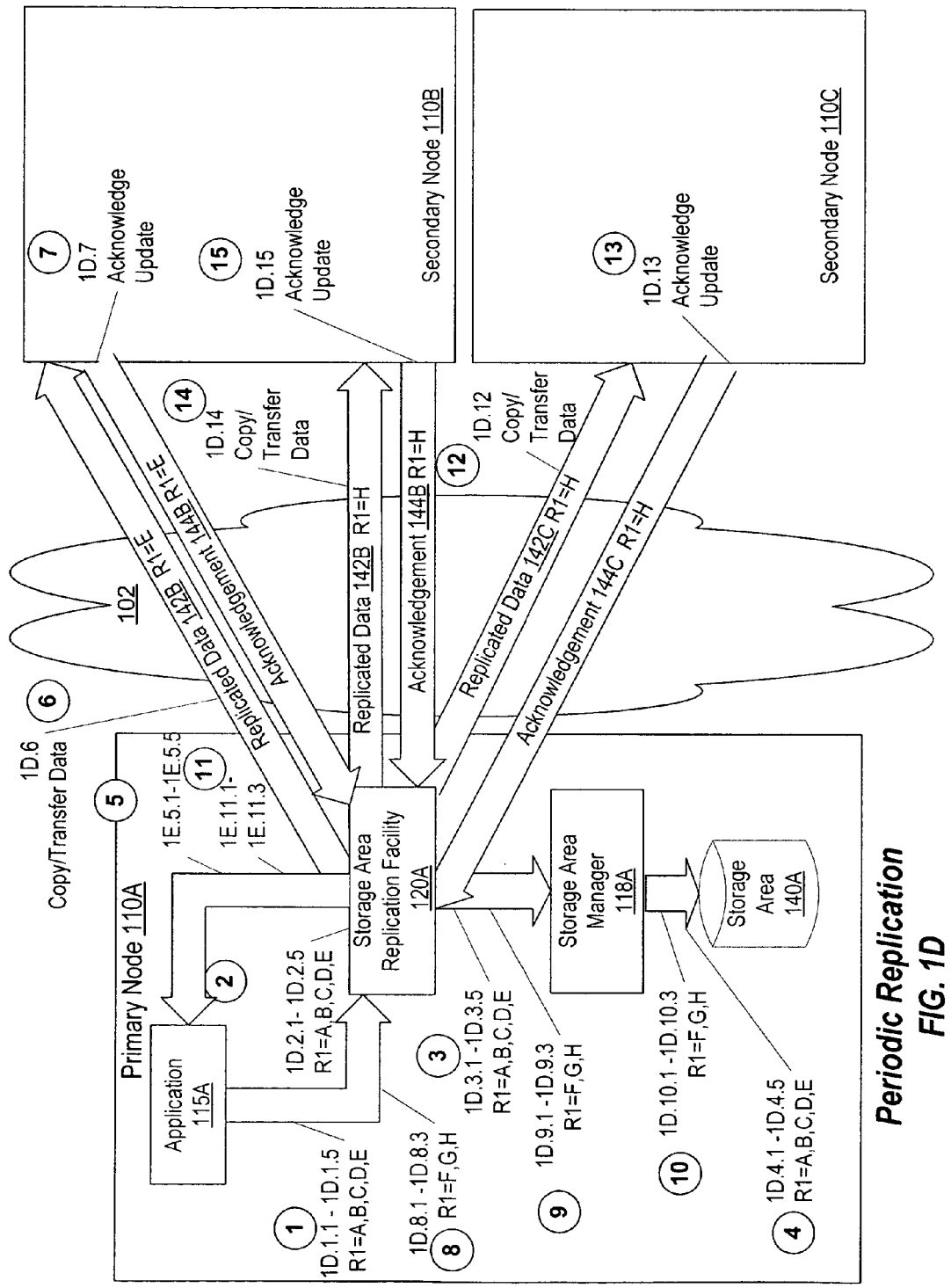
FIG. 1D shows periodic replication in the system of FIG. 1A.

FIG. 1D shows periodic replication in the system of FIG. 1A. Note that a storage replication is log not used in this example, although the scope of the invention includes use of a storage replication log during periodic replication. Assume that the data in storage areas 140A, 140B, and 140C (on primary node 110A, secondary nodes 110B and 110C, respectively) are initially synchronized.

Actions 1D.1.1 through 1D.1.5 represent a set of requests to write a series of values to region 1 of storage area 140A. In time sequence, these actions represent that region 1 is initially written to have a value of A, and subsequently overwritten with values B, C, D, and E. Actions 1D.2.1 through 1D.2.5 represent a set of intercepts of the requests made in the set of actions 1D.1.1 through 1D.1.5 by storage area replication facility 120A. Actions 1D.3.1 through 1D.3.5 represent issuing the respective write operation for the current value of region 1 to storage area 140A, and actions 1D.4.1 through 1D.4.5 represent writing the respective value (A, B, C, D or E) to region 1. 1D.5.1 through 1D.5.5 represent notifying the initiating application 115A that the write operation is complete. The numbering of the actions is not intended to imply that all of the set of actions 1D.1.1 through 1D.1.5 (write operations for R1=A) must be completed before the set of actions 1D.2.1 through 1D.2.5 (R1=B) can begin. Actions within each write operation, such as actions 1D.1.1, 1D.2.1, 1D.3.1, 1D.4.1, and 1D.5.1, (requesting the write through notifying the initiating application 115A) should occur in sequence.

When actions 1D.1.1 through actions 1D.5.5 are completed, region 1 has been updated five times. In action 1D.5, replicated data 142B, in which region 1 has a value of E (R1=E), are replicated to secondary node 110B. In action 1D.6, upon receiving replicated data 142B, activities occur on secondary node 110B to write R1=E to a storage area on secondary node 110B (similar to actions 1C.10, 1C.11, and 1C.12 of FIG. 1C). In action 1D.7, secondary node 110B acknowledges receipt of update R1=E. At this point in time, secondary nodes 110B and 110C are no longer synchronized with respect to region 1.

In actions 1D.8.1 through actions 1D.11.3, region 1 is updated three more times, with values of R1=F, G, and H. In action 1D.12, replicated data 142C, in which region 1 has a value of H (R1=H), are replicated to secondary node 110B. In action 1D.13, upon receiving replicated data 142E, secondary node 110C stores the data for update R1=H (not shown) and acknowledges receipt of update R1=E. In action 1D.14, replicated data R1=H are sent to secondary node 110B, and in action 1D.15, replicated data R1=H are acknowledged. At this point in time, secondary nodes 110B and 110C are synchronized.

Figure 1E:
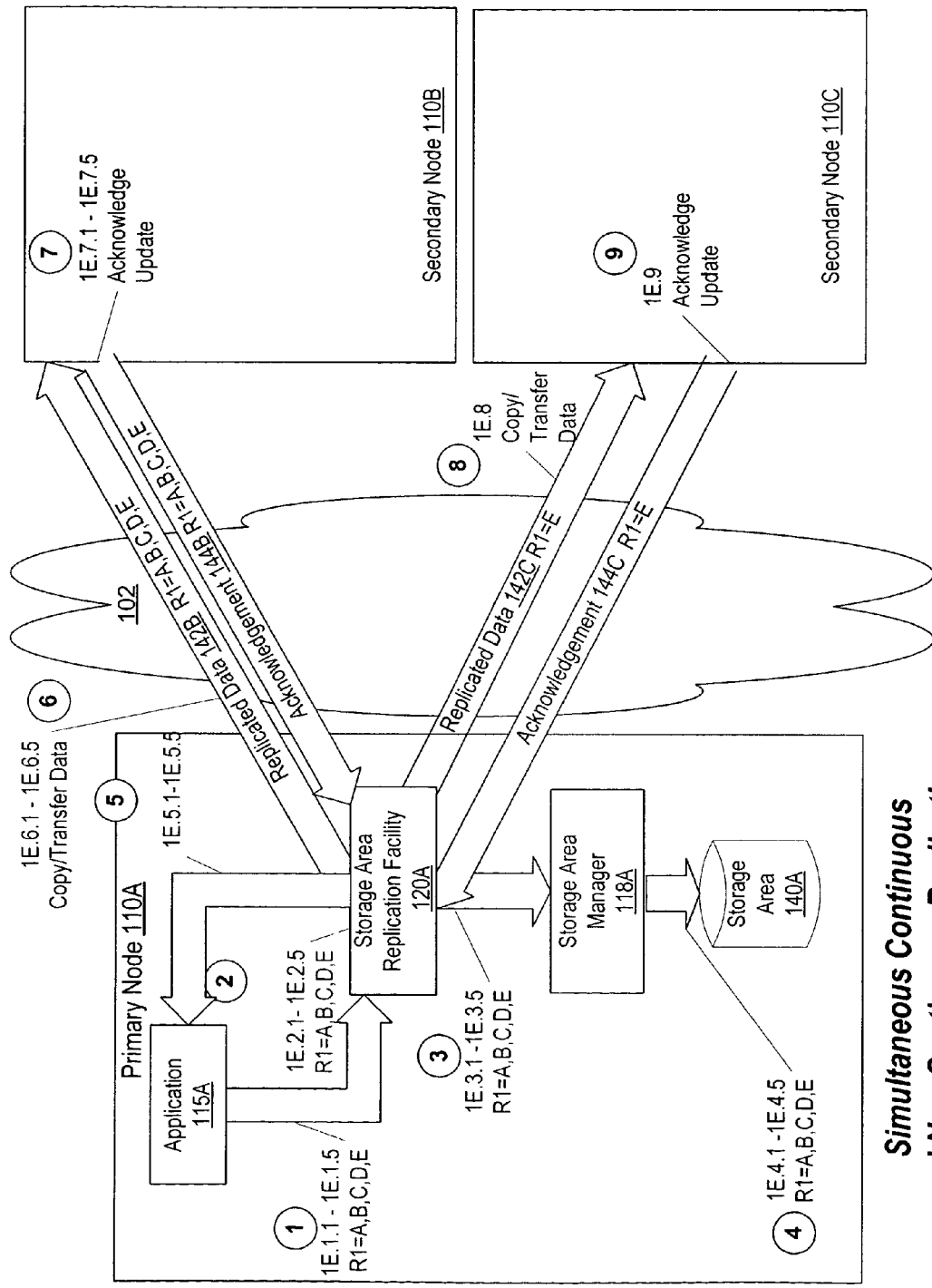
FIG. 1E shows simultaneous continuous and non-continuous replication in the system of FIG. 1A.

FIG. 1E shows simultaneous continuous and non-continuous replication in the system of FIG. 1A. Reference numbers 1 through 9 for sets of actions described in FIG. 1E are provided in circles for the reader's convenience. Assume that the data in storage areas 140A, 140B, and 140C (on primary node 110A, secondary nodes 110B and 110C, respectively) are initially synchronized. In the example of FIG. 1E, data are replicated to secondary node 110B asynchronously and to secondary node 110C periodically.

Actions 1E.1.1 through 1E.1.5 represent a set of requests to write a series of values to region 1 of storage area 140A. In time sequence, these actions represent that region 1 is initially written to have a value of A, and subsequently overwritten with values B, C, D, and E. Results of each update operation are communicated asynchronously to secondary node 110B. Actions 1E.2.1 through 1E.2.5 represent a set of intercepts of the requests made in the set of actions 1E.1.1 through 1E.1.5 by storage area replication facility 120A. Actions 1E.3.1 through 1E.3.5 represent issuing the respective write operation for the current value of region 1 to storage area 140A, and actions 1E.4.1 through 1E.4.5 represent writing the respective value (A, B, C, D or E) to region 1. Actions 1E.5.1 through 1E.5.5 represent notifying the initiating application 115A that the write operation is complete. Actions 1E.6.1 through 1E.6.5 represent copying and sending the data to secondary node 110B, and actions 1E.7.1 through 1E.7.5 represent acknowledgement of each update.

When actions 1E.1.1 through actions 1E.7.5 are completed, region 1 has been updated five times, sent to secondary node 110B five times, and acknowledged five times. In action 1E.8, replicated data 142C, in which region 1 has a value of E (R1=E), are replicated to secondary node 110C. In action 1E.9, upon receiving replicated data 142C, activities occur on secondary node 110C to write R1=E to a storage area on secondary node 110C (similar to actions 1C.10, 1C.11, and 1C.12 of FIG. 1C). Secondary node 110C acknowledges receipt of update R1=E. At this point in time, secondary nodes 110B and 110C are synchronized with respect to region 1.

The examples of FIGS. 1A through 1C show continuous replication in an environment in which updated data for each write operation are replicated to a secondary node, the example of FIG. 1D shows periodic replication in which data are replicated periodically, and the example of FIG. 1E shows simultaneous continuous and non-continuous replication. The invention is not limited to any particular type of replication, and the examples of asynchronous, synchronous, and periodic replication provided herein are not intended to limit the scope of the invention.

The present invention enables only the storage objects that are "out of sync" to be synchronized, greatly reducing the time required for failover. FIGS. 2A and 2B, collectively referred to as FIG. 2, show events performed when continuously (i.e., synchronously and/or asynchronously) replicating data to multiple secondary nodes in accordance with the present invention. Event 2.1 shows an example of an initial state of the environment when replication begins. A primary volume, volume P, contains eight regions, none of which contains data in the example. (The representation of the data in the storage volumes is greatly simplified. One of skill in the art will recognize that the example is provided for illustration purposes only, that many more regions can be included in a storage volume, and that each region can contain many bytes of data.) Assume that primary volume P is hosted by a respective primary node, such as primary node 110A of FIG. 1, and that the primary node hosts software performing functionality similar to that performed by storage area replication facility 120A. An R1 counter variable is created to track changes to data stored in region 1 of volume P when an update to the data stored in region 1 is made. Similar variables for each of regions 2 through 8 also are used to track changes in those respective regions, but are not shown to simplify the example.

Three secondary volumes—S1, S2, and S3—are used to store replicated data. Volumes S1, S2, and S3 are each synchronized with primary volume P, as none of the volumes has data in the eight regions. Assume that each of secondary volumes S1, S2, and S3 is hosted by a respective secondary node, such as secondary nodes 110B, 110C, and 110D of FIG. 1C, and that each secondary node hosts software performing functionality similar to that performed by storage area replication facilities 120B, 120C, and 120D. Assume that data from primary volume P are replicated to volume S1 synchronously and to volumes S2 and S3 asynchronously.

Each of secondary storage volumes S1, S2, and S3 has an associated volume map made up of eight indicators, with each indicator representing a respective region of the respective storage volume. In the example shown, all of the indicators making up the secondary volume maps have values of zero. A value of zero is used herein to represent that the data in the respective region has not been changed since all of the secondary volumes were synchronized with primary volume P. The indicators can be implemented as bits (with the set of indicators referred to as a bitmap or map), as logical variables, or as specific variable values. The primary node may also maintain an associated primary volume map (not shown in FIG. 2).

In event 2.2, data having a value of "A" for region 1 of volume P are written to a log(not shown). In event 2.3, the update to the data in region 1 having a value of "A," referred to as "R1=A," is distributed to each of the secondary nodes (as described, for example, in FIG. 1C actions 1C.4.1, 1C.4.2, and 1C.4.3). The R1 counter variable value is created and updated to have a value of three because three secondary nodes are provided with the update. The value of the R1 counter variable indicates the number of secondary nodes to which the update is being sent, three in this case.

In event 2.4, secondary node S1 receives update R1=A. Region 1 of volume S1 is updated with a value of "A," and the corresponding indicator for region 1 in the volume S1 map is set to one, indicating that the value of respective region 1 has been changed. In an alternative embodiment, region 1 of volume S1 may not be updated directly, but instead the change to region 1 may be written to a log and committed to volume 51 later asynchronously.

In event 2.5, an acknowledgement is received from the node hosting volume S1 indicating that data updating R1=A have been received. The R1 counter variable is updated to indicate that one of the outstanding secondary nodes has acknowledged the update to region 1 and that only two outstanding write operations exist for region 1. In event 2.6, the program requesting that region 1 be updated to have a value of "A" (e.g., application 115A of FIG. 1A) is notified that the write operation is complete. In event 2.7, the primary node asynchronously updates region 1 to have a value of "A," as indicated in the "Volume P" column of the table.

In event 2.8 data having a value of "B" are written to region 1 of volume P in a log (not shown). In event 2.9 the update R1=B is distributed to each of the secondary nodes. The R1 counter variable value is updated to have a value of five because three secondary nodes were provided with the update R1=B and there are two outstanding updates for R1=A. In event 2.10, the secondary node hosting volume S1 receives update R1=B, region 1 of volume S1 is updated with a value of "B," and the corresponding indicator for region 1 in the volume S1 map remains set at one, indicating that the value of respective region 1 has been changed. In an alternative embodiment in which updates are not committed directly to secondary storage volumes but instead written to a log, the update R1=B to secondary volume S1 would be made later asynchronously.

Referring to FIG. 2B, the sequence of events continues with event 2.11. In event 2.11, an acknowledgement is received from the node hosting volume S1 indicating that the update R1=B has been received. The R1 counter variable is updated to indicate that one of the outstanding secondary nodes has acknowledged update R1=B and that four outstanding write operations exist for region 1.

In event 2.12, the program requesting that region 1 be updated to have a value of "B" is notified that the write operation is complete. In event 2.13, the secondary nodes hosting volumes S2 and S3 receive update R1=A. Respective indicators for region 1 are set in the volume S2 map and the volume S3 map to show that the data have changed.

In event 2.14, the node hosting volume S2 acknowledges update R1=A. The value of the R1 counter is updated to show that three write operations are outstanding (one for update R1=A on volume S2 and two for update R1=B). In event 2.15, the node hosting volume S3 acknowledges update R1=A. The value of the R1 counter is updated to show that two write operations are outstanding for update R1=B. Even though all nodes have now acknowledged update R1=A to region 1, the value of R1 counter shows that outstanding write operations remain to be applied to region 1 and therefore all secondary nodes are not synchronized.

In event 2.16, the secondary nodes hosting volumes S2 and S3 receive update R1=B. Respective indicators for region 1 remain set in the volume S2 map and the volume S3 map to show that the data have changed. In event 2.17, the node hosting volume S2 acknowledges update R1=B. The value of the R1 counter is updated to show that one write operation is outstanding (update R1=B to volume S3). In event 2.18, the node hosting volume S3 acknowledges update R1=B. The value of the R1 counter is updated to show that no write operations are outstanding.

When a determination is made that all write operations have been completed by all secondary nodes (by noting that the value of R1 counter is now zero), memory for the R1 counter can be freed, since no outstanding write operations for region 1 exist. In event 2.19, the primary node sends a notification to all secondary nodes to clear the bit (indicator) for region 1. Notifying the secondary nodes to clear indicators can be performed asynchronously, sent in batches of notifications for several different regions, and/or sent along with a subsequent set of data to be sent to each secondary node. Setting the bit for region 1 to have a value of one is equivalent to setting an "outstanding update" or "out of sync" indicator. In event 2.20, the bits (indicators) are cleared, indicating that the data in region 1 of primary volume P and secondary volumes S1, S2, and S3 are synchronized. Resetting the bit for region 1 to have a value of zero is equivalent to resetting the "outstanding update" or "out of sync" indicator or to setting an "in sync" indicator. One of skill in the art will recognize that counters and bits (or logical variables) are example implementations of indicators. Other forms of indicators for tracking whether a given update, updated region, or updated region/secondary node combination has been sent and has received (acknowledged) are within the scope of the invention.

If the primary node fails after data are sent to secondary nodes, e.g., after event 2.3 is performed, a new primary node can be selected from among the secondary nodes. In one embodiment, the most recently updated secondary node is selected as the new primary node. The most recent secondary node can be determined using sequence numbers of update transactions to the storage volumes. Because write operations are performed in the same order on the primary and secondary nodes when data are replicated continuously (i.e., synchronously or asynchronously), a unique sequence number is assigned to each update transaction, and the most recent update transaction has the highest sequence number. These sequence numbers are generated by the instance of the replication facility running on the primary node, such as storage area replication facility 120A on primary node 110A of FIG. 1A. The storage volume with the highest sequence number is selected as the most recently updated secondary node.

In other embodiments in which the most recently updated secondary node is not known, any one of the secondary nodes can be selected as the new primary node. The new primary node can synchronize the other secondary nodes with the contents of each region in its respective storage volume. Even though the respective storage volume for the new primary node may not be the most recently updated volume, as long as the data in the secondary volumes are consistent, the application managing the data can be restarted on the new primary node.

If the most recently updated secondary node is selected as the new primary node and the primary node also maintains a primary volume map, the indicators in the new primary's volume map are a superset of the indicators set in the other secondary volume maps. Therefore, the new primary can synchronize the secondary volumes with the regions indicated in the new primary's volume map. If the most recently updated secondary node is not known, the new primary node can obtain the volume maps from each remaining secondary node. A union of the new primary node's volume map and each remaining secondary node's volume map identifies the regions to synchronize for that secondary.

Figure 3:
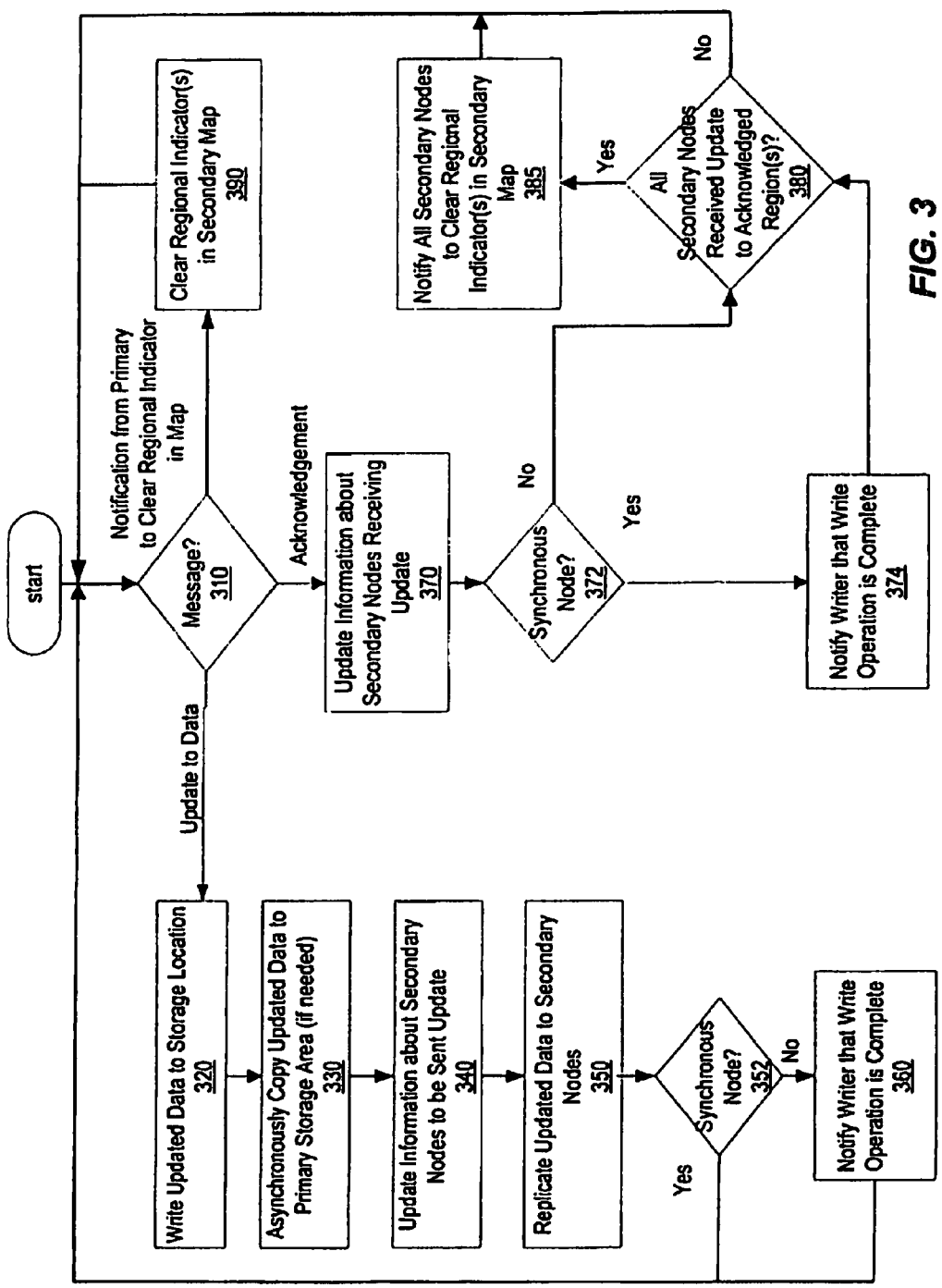
FIG. 3 is a flowchart of the actions performed by a replication facility operating in accordance with one embodiment of the present invention.

FIG. 3 is a flowchart of the actions performed by a replication facility operating in accordance with the present invention. At "Message?" decision point 310, the replication facility waits for messages. When a message is received and the message is an update to data (such as the update made in action FIG. 1A action 1A.1), the receiving instance of the replication facility is operating on a primary node, and control proceeds to "Write Updated Data to Storage Location" step 320. The storage location can be a storage replication log (such as storage replication log 130A of FIG. 1A to which data are written in action 1A.3), a memory buffer, and/or a storage area, such as storage volume 140A of FIG. 1A. Control proceeds to "Asynchronously Copy Updated Data to Primary Storage (if needed)" step 330. If the data were not written to the primary storage volume directly (i.e., are written to a memory buffer or log instead) in "Write Updated Data to Storage Location" step 320, the updated data are copied from the memory buffer or log to the primary storage area. Because the data are copied asynchronously, "Asynchronously Copy Updated Data to Primary Storage" step 330 alternatively can be performed at a later time.

Control then proceeds from "Asynchronously Copy Updated Data to Primary Storage" step 330 to "Update Information about Secondary Nodes to be Sent Update" step 340, where information (such as the R1 Counter of FIG. 2) is updated for the region and secondary node to which the update was sent. Control then proceeds to "Replicate Updated Data to Secondary Nodes" step 350, where the data affected by the update are copied and transferred to respective secondary nodes (similar to the copying of data in FIG. 1C actions 1C.4.1, 1C.4.2, and 1C.4.3).

Control then proceeds to "Synchronous Node?" decision point 352, where a determination is made whether the node making the update is a synchronous node. If the node is synchronous, an acknowledgement must be received before the writer can be notified that the write operation is complete, and control returns to "Message?" decision point 310 to await another message. If the node is asynchronous, control proceeds to "Notify Writer that Write Operation is Complete" step 360, and the writer of the update is notified that the write operation is complete. Control then returns to "Message?" decision point 310 to await another message.

If at "Message?" decision point 310, the replication facility receives an acknowledgement of an update from a secondary node, the receiving instance of the replication facility is operating on a primary node, and control proceeds to "Update Information about Secondary Nodes Receiving Update" step 370. For example, having just received an acknowledgement, the replication facility decrements the appropriate regional counter(s) for the acknowledged update. Control then proceeds to "Synchronous Node" decision point 372, where a determination is made whether the node from which the acknowledgement was received is a synchronous node. If so, control proceeds to "Notify Writer that Write Operation is Complete" step 374, and the writer of the update is notified that the write operation is complete. As described above, when an update is sent to a synchronous node, an acknowledgement must be received from the synchronous secondary node before the writer can be informed that the write operation is complete. The functionality of "Notify Writer that Write Operation is Complete" step 360 and "Notify Writer that Write Operation is Complete" step 374 is the same, and that these two steps can be implemented by the same module. However, from "Notify Writer that Write Operation is Complete" step 374 (i.e., after receiving an acknowledgement from a synchronous node and notifying the application initiating the original update that the update is complete), control proceeds to "All Secondary Nodes Received Update to Acknowledged Region(s)?" decision point 380.

At "All Secondary Nodes Received Update to Acknowledged Region(s)?" decision point 380, if all secondary nodes have received the update (e.g., all secondary nodes have acknowledged the update and the value of each regional counter is now zero), control proceeds to "Notify All Secondary Nodes to Clear Regional Indicator(s) in Secondary Map" step 385. In one embodiment, notifying the secondary nodes includes sending a message to a counterpart replication facility instance running on the secondary nodes, and the counterpart replication facility instance clears the regional indicator(s) in the respective map. As a result of clearing the regional indicator(s), the secondary node maps indicate that no outstanding write operations to the respective region(s) exist.

If at "All Secondary Nodes Received Update to Acknowledged Region(s)?" decision point 380, all nodes have not yet acknowledged the update (e.g., the value of the regional counter is not zero), outstanding write operations remain for the region. Control returns to "Message?" decision point 310, where the replication facility awaits another message.

If at "Message?" decision point 310, the replication facility receives a notification from a primary node to clear a regional indicator in the secondary volume map, the instance of the replication facility is operating on a secondary node. Control proceeds to "Clear Regional Indicator(s) in Secondary Map" step 390. The regional indicator(s) for the acknowledged region(s) is cleared, indicating that no outstanding write operations exist for the region, and control returns to "Message?" decision point 310, where the replication facility awaits another message.

Referring back to FIGS. 1A through 1C, storage replication log 130A is used on primary node 110A for logging writes so that writes can be asynchronously written to storage area 140A on primary node 110A. As described above, the application generating the write operation, such as file system 115A of FIG. 1A, can be notified that the write is complete as soon as data are written in storage replication log 130A (e.g., after action 1A.2.2 of FIG. 1A is complete).

In one embodiment of the invention, storage replication logs are maintained on both the primary and secondary nodes. The receipt of data from the primary node is acknowledged when the secondary node completes writing the data to a respective storage replication log. Data are written asynchronously from the storage replication logs on the secondary nodes to storage volumes on the secondary nodes, such as storage area 140B on secondary node 110B of FIG. 1A.

The embodiments described with reference to FIGS. 1 through 4B describe the operation in an environment in which data are replicated for each write operation. In periodic replication, a secondary node is periodically updated with changes that have been written to primary volumes of a primary node over a period of time, rather than with each write operation. Periodic replication is described in co-pending patent application Ser. No. 10/436,354, (client reference VRTS 0262), filed on May 12, 2003, entitled "Method and System for Providing Periodic Replication" and naming as inventors Anand A. Kekre, Ronald S. Karr, and John A. Colgove. This co-pending application is hereby incorporated herein by reference in its entirety and for all purposes.

Periodic replication complicates the failover process because data can be replicated at different time intervals to different secondary nodes. Data may be replicated more frequently to some secondary nodes. As a result, one region of data may be changed and replicated multiple times to one secondary node before the same region is replicated once to another secondary node. One embodiment of the invention described herein requires all secondary nodes to acknowledge receipt of an update of a particular region before action is taken at all nodes (e.g., clearing the bits for the region in all secondary node volume maps). Nodes that receive replicated data at longer time intervals may "miss" some updates to a given region, which can be acceptable as long as the node is periodically synchronized with the other secondary nodes.

FIG. 4 shows an example of events performed when periodically replicating data to multiple secondary nodes in accordance with one embodiment of the invention. To be able to detect whether data for a particular region are synchronized across all secondary nodes, the primary node can maintain additional information about updates received at each secondary node, rather than just a counter of a number of secondary nodes to which an update is sent. In the embodiment illustrated in FIG. 4, the information is tracked as a set of two indicators for each region/secondary node combination, a sent indicator and a received indicator. Such indicators may be implemented as a set of two bitmaps for each region, where each bitmap has one bit for each secondary node. The sent bitmap tracks the secondary nodes to which an update to the respective region is sent. The received bitmap tracks acknowledgements received from the secondary nodes for the updates to the respective region. In an alternative embodiment, the sent and received indicators can be counters for each region/secondary node combination, such as the R1 counter described with reference to FIG. 2.

In the example shown in FIG. 4, data from primary volume P are periodically replicated to secondary volumes S1, S2, and S3. The values of the sent and received bitmaps for each region and secondary node are represented as separate columns of the table. The initial state is shown in event 4.1, where all of the indicators making up the secondary volume maps have values of zero. A value of zero is used herein to represent that the data in the respective region have not been changed since all of the secondary volumes were synchronized with primary volume P. The sent and received bitmaps for region 1 also contain all zeros for secondary volumes S1, S2, and S3. Volume P, volume S1, volume S2, and volume S3 are synchronized, showing no data in any of the storage volumes.

In event 4.2, a value of "A" is written to region 1 (referred to as update "R1=A"). In event 4.3, a periodic update of region 1 is sent to the secondary node hosting storage volume S1. An indicator is set in the "sent" column for storage volume S1 region 1. In event 4.4, the node hosting volume S1 receives a copy of region 1 reflecting R1=A and sets a respective indicator in the volume S1 map. In event 4.5, the node hosting volume S1 acknowledges update R1=A. The primary node updates the "received" indicator for storage volume S1 region 1. In event 4.6, a value of "B" is written to region 1 of primary volume P. In event 4.7, updated region 1 is sent to secondary nodes hosting storage volumes S1, S2, and S3, and the respective "sent" indicators are set for storage volumes S1, S2, and S3 region 1. The "received indicator" for storage volume S1 region 1 is reset to zero to indicate that another acknowledgement is awaited from the secondary node hosting volume S1 before all secondary nodes can be considered to be synchronized. Note that update R1=A was never sent to the nodes hosting storage volumes S2 and S3. As of the point in time when update R1=B is sent, secondary volumes S1, S2, and S3 are not synchronized.

In events 4.8, and 4.9, secondary nodes hosting storage volumes S1, S2, and S3 receive and acknowledge the update R1=B. Respective indicators are set for region 1 in the storage volume S1, S2 and S3 maps in event 4.8. Respective "received" indicators are set for region 1 for each of the storage volume S1, S2, and S3 when the acknowledgements are received in event 4.9. Now that all storage volumes have received a current copy of region 1, all secondary nodes are synchronized with respect to region 1. This condition is reflected by the fact that all "sent" and "received" indicators for all secondary nodes have values of one.

In event 4.10, the primary node sends a notification to all secondary nodes that region 1 is synchronized. Note that the sent and received indicators for region 1 are reset to zero for storage volumes S1, S2, and S3, because no outstanding update operations exist. Even though the update operation for R1=A was never sent to the secondary nodes hosting storage volumes S2 and S3, those nodes now have a current value of R1=B for region 1 in storage volumes S2 and S3. In event 4.11, the region 1 bits are cleared by secondary nodes hosting storage volumes S1, S2, and S3, indicating that region 1 is synchronized.

In the example shown in FIG. 4, a secondary node may be sent an update but never acknowledge receiving the update. One way to address this problem is to investigate whether the secondary node is functioning before sending another update to a region for which an update has not been acknowledged. If the secondary node is not functioning, it may be desirable to remove the secondary node from the set of nodes to which changes are replicated. Removing a non-functional secondary node enables the remaining nodes to be considered to be synchronized when all of the remaining functional secondary nodes have acknowledged an update.

In another embodiment of the invention, sent and received counters, rather than indicators, can be used for each region/secondary node combination. If the sent counter has a value greater than the value of the received counter, at least one update has been sent for the respective region/secondary node combination that has not been acknowledged. When the sent and received counters for a given region/secondary node combination have equal values, all updates sent for that given region at that secondary node have been acknowledged. When all sent and received counters for a given region/secondary node combination become equal and are non-zero (indicating that at least one update has been sent to each respective region/secondary node combination), all counters for the region/secondary node combination can be reset to zero and/or memory for the sent and received counters can be freed. A notification can be sent to all secondary nodes that all secondary nodes are synchronized with regard to that region.

Incrementing a sent counter for a given region/secondary node combination is equivalent to setting the sent bit to one in the example of FIG. 4. Incrementing a received counter is equivalent to resetting the sent bit to zero in the example of FIG. 4, as the effect of incrementing the received counter is to indicate that the particular update has been received, thereby offsetting the increment to the sent counter. The implementation shown in FIG. 5 tracks updates at a finer level of granularity, a region/secondary node combination, whereas in FIG. 4, updates are tracked at the region level. Other levels of granularity (for example, an update level) are within the scope of the invention.

If an acknowledgement is not received from a secondary node, the secondary node may have failed. Data resulting from another write operation can be prevented from being sent for that region/secondary node combination until a determination can be made whether the node is functional. If the node is functional, results of a subsequent write operation can be sent despite the failure to acknowledge the previous write operation. If an acknowledgement is received for the subsequent write operation to the region/secondary node combination, then the region can be considered to be synchronized with the other nodes receiving the subsequent update. For example, the received counters can be set to have values equal to the values of the sent counters when the most recent update for a given region/secondary node is acknowledged by all secondary nodes. At this point, a notification can be sent to all secondary nodes to clear the indicator for the given region because all of the secondary nodes are synchronized with regard to that region.

FIG. 5 shows an example of events illustrating use of a set of sent and received counters for each region/secondary node combination. In the example shown in FIG. 5, data from primary volume P are replicated to secondary volumes S1, S2, and S3. The initial state is shown in event 5.1, where all of the indicators making up the secondary volume maps have values of zero. A value of zero is used herein to represent that the data in the respective region have not been changed since all of the secondary volumes were synchronized with primary volume P. The values of the sent and received counters for each region/secondary node combination are initially set to zero. Volume P, volume S1, volume S2, and volume S3 are synchronized, showing no data in any of the storage volumes.

In event 5.2, a value of "A" is written to region 1 (referred to as update "R1=A"). In event 5.3, an update of region 1 is sent to the secondary nodes hosting storage volumes S1 and S2, and the sent counters are incremented for region 1/storage volumes S1 and S2. In event 5.4, the node hosting volume S1 receives a copy of region 1 reflecting R1=A and sets a respective indicator in the volume S1 map. In event 5.5, the node hosting volume S1 acknowledges update R1=A. In event 5.6, the primary node updates the received counter for storage volume S1 region 1. In event 5.7, a value of "B" is written to region 1 of primary volume P. In event 5.8, updated region 1 is sent to secondary nodes hosting storage volumes S1, S2, and S3, and the respective sent counters are incremented for region 1/storage volumes S1, S2, and S3. Storage volumes S1 and S2 now show a value of two for the sent counters, and storage volume S3 has a sent counter value of one.

In events 5.9, secondary nodes hosting storage volumes S1, S2, and S3 receive the update R1=B, and respective indicators are set for region 1 in the storage volume S1, S2 and S3 maps. In action 5.10, the node hosting storage volume S2 acknowledges receipt of update R1=A. The received counter for region 1/storage volume S2 is incremented from a value of zero to a value of one. In action 5.11, the node hosting storage volume S3 receives update R1=B and sets a bit in the volume S3 map. In event 5.12, nodes hosting storage volumes S1, S2, and S3 each acknowledge receiving update R1=B. Respective received counters are incremented for region 1 for each of the storage volume S1, S2, and S3. Now that all storage volumes have received a current copy of region 1, all secondary nodes are synchronized with respect to region 1. This condition is reflected by the fact that all sent and received counters for region 1 at all secondary nodes have equal values and are non-zero.

In event 5.13, the primary node sends a notification to all secondary nodes that region 1 is synchronized. Note that the sent and received counters for region 1 are reset to zero for storage volumes S1, S2, and S3, because no outstanding update operations exist. In event 5.14, the region 1 bits are cleared by secondary nodes hosting storage volumes S1, S2, and S3, indicating that region 1 is synchronized.

The invention operates by tracking nodes to which updates are sent for each region of the primary volume between points in time at which all of the primary and secondary volumes are synchronized. The invention also tracks nodes acknowledgements received for each update and regions changed at each node since the last synchronization of all primary and secondary nodes. This information enables regions that are unsynchronized to be quickly identified and synchronized, greatly reducing the time required for failover.

The functionality for performing replication and failover described herein can be implemented in a multi-node environment using a variety of computer systems and networks. An example of one such computing environment is described below with reference to FIG. 6.

An Example Computing and Network Environment

Figure 6:
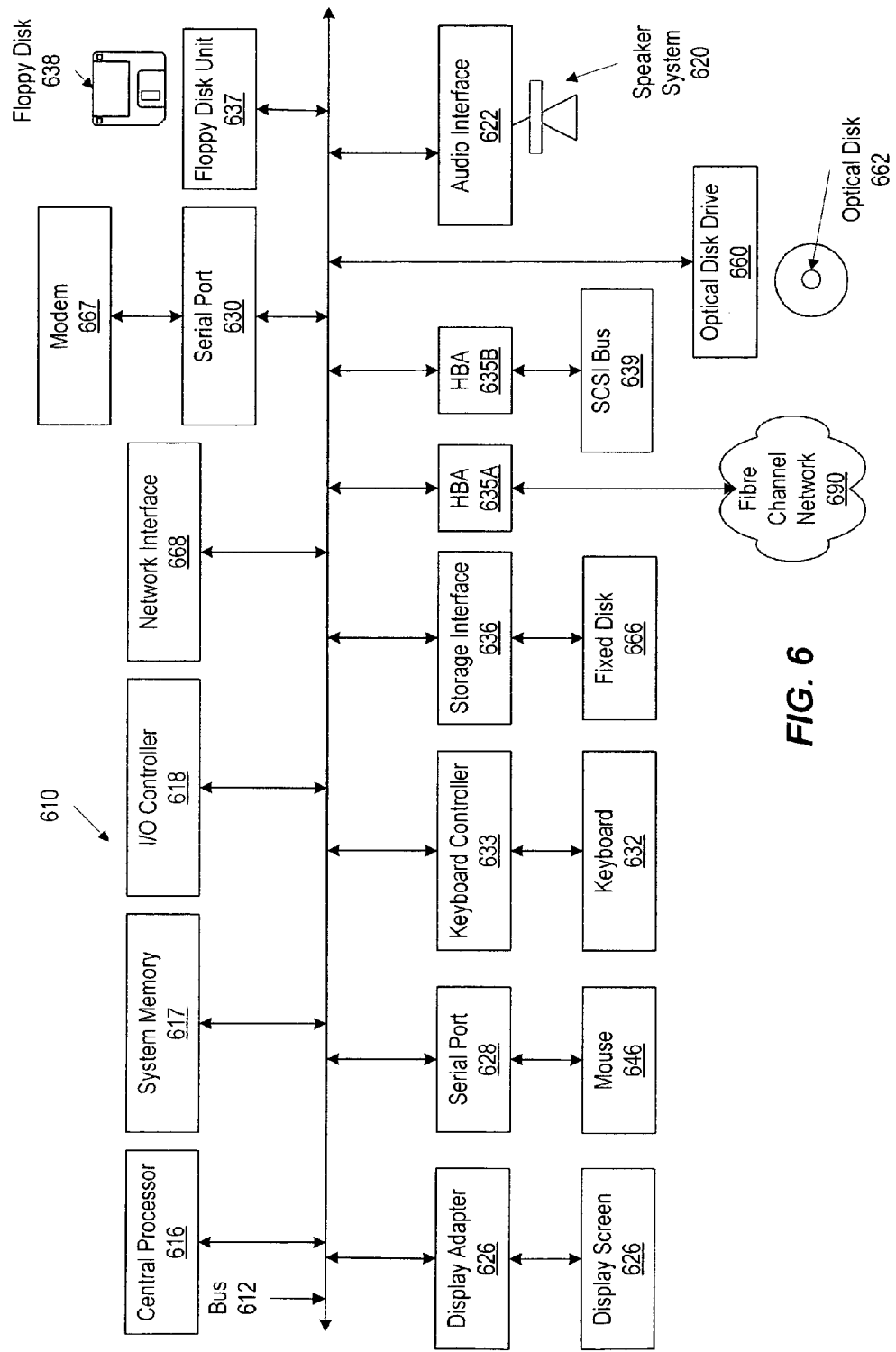
FIG. 6 shows an example of a computer system that can be used to operate the present invention.

FIG. 6 depicts a block diagram of a computer system 610 suitable for implementing the present invention. Computer system 610 includes a bus 612 which interconnects major subsystems of computer system 610, such as a central processor 614, a system memory 617 (typically RAM, but which may also include ROM, flash RAM, or the like), an input/output controller 618, an external audio device, such as a speaker system 620 via an audio output interface 622, an external device, such as a display screen 624 via display adapter 626, serial ports 628 and 630, a keyboard 632 (interfaced with a keyboard controller 633), a storage interface 634, a floppy disk drive 637 operative to receive a floppy disk 638, a host bus adapter (HBA) interface card 635A operative to connect with a fibre channel network 690, a host bus adapter (HBA) interface card 635B operative to connect to a SCSI bus 639, and an optical disk drive 640 operative to receive an optical disk 642. Also included are a mouse 646 (or other point-and-click device, coupled to bus 612 via serial port 628), a modem 647 (coupled to bus 612 via serial port 630), and a network interface 648 (coupled directly to bus 612).

Bus 612 allows data communication between central processor 614 and system memory 617, which may include read-only memory (ROM) or flash memory (neither shown), and random access memory (RAM) (not shown), as previously noted. The RAM is generally the main memory into which the operating system and application programs are loaded and typically affords at least 64 megabytes of memory space. The ROM or flash memory may contain, among other code, the Basic Input-Output system (BIOS) which controls basic hardware operation such as the interaction with peripheral components. Applications resident with computer system 610 are generally stored on and accessed via a computer readable medium, such as a hard disk drive (e.g., fixed disk 644), an optical drive (e.g., optical drive 640), floppy disk unit 637 or other storage medium. Additionally, applications may be in the form of electronic signals modulated in accordance with the application and data communication technology when accessed via network modem 647 or interface 648.

Storage interface 634, as with the other storage interfaces of computer system 610, may connect to a standard computer readable medium for storage and/or retrieval of information, such as a fixed disk drive 644. Fixed disk drive 644 may be a part of computer system 610 or may be separate and accessed through other interface systems. Modem 647 may provide a direct connection to a remote server via a telephone link or to the Internet via an Internet service provider (ISP). Network interface 648 may provide a direct connection to a remote server via a direct network link to the Internet via a POP (point of presence). Network interface 648 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., bar code readers, document scanners, digital cameras and so on). Conversely, it is not necessary for all of the devices shown in FIG. 6 to be present to practice the present invention. The devices and subsystems may be interconnected in different ways from that shown in FIG. 6. The operation of a computer system such as that shown in FIG. 6 is readily known in the art and is not discussed in detail in this application. Code to implement the present invention may be stored in computer-readable storage media such as one or more of system memory 617, fixed disk 644, optical disk 642, or floppy disk 638. Additionally, computer system 610 may be any kind of computing device, and so includes personal data assistants (PDAs), network appliances, X-window terminals or other such computing devices. The operating system provided on computer system 610 may be MS-DOS®, MS-WINDOWS®, OS/2®, UNIX®, Linux®, or another known operating system. Computer system 610 also supports a number of Internet access tools, including, for example, an HTTP-compliant web browser having a JavaScript interpreter, such as Netscape Navigator®, Microsoft Explorer®, and the like.

Other Embodiments

Replication facilities 120A, 120B, 120C and 120D of FIGS. 1A through 1C are examples of one implementation of the functionality performed by the present invention. One of skill in the art will recognize that the functionality described for the replication facility described herein may be performed by various modules, instructions, and/or other means of providing the functionality. For example, an identifying module may be used to identify secondary nodes to which an update to data in a region of a storage area is sent. A sending module may be used to send a notification to each of the secondary nodes that the update is complete when all of the secondary nodes have acknowledged the update.

A setting module may set a respective indicator (e.g., an "outstanding update" or "out of sync" indicator) to indicate that the data have changed in a respective region of a respective storage area at one of the secondary nodes when the update has been received at that secondary node. A resetting module may reset the indicator(s) for the respective region(s) when the notification sent by the primary node is received at a secondary node. A synchronizing module may synchronize the data in the storage areas at the secondary nodes. Synchronization may be performed upon primary node failure, at set intervals, or in response to a synchronization command. Other configurations to perform the same functionality are within the scope of the invention.

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

The foregoing described embodiments include components contained within other components. It is to be understood that such architectures are merely examples, and that, in fact, many other architectures can be implemented which achieve the same functionality. In an abstract but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermediate components. Likewise, any two components so associated can also be viewed as being "operably connected," or "operably coupled," to each other to achieve the desired functionality.

The foregoing detailed description has set forth various embodiments of the present invention via the use of block diagrams, flowcharts, and examples. It will be understood by those within the art that each block diagram component, flowchart step, operation and/or component illustrated by the use of examples can be implemented, individually and/or collectively, by a wide range of hardware, software, firmware, or any combination thereof.

The present invention has been described in the context of fully functional computer systems; however, those skilled in the art will appreciate that the present invention is capable of being distributed as a program product in a variety of forms, and that the present invention applies equally regardless of the particular type of signal bearing media used to actually carry out the distribution. Examples of signal bearing media include recordable media such as floppy disks and CD-ROM, transmission type media such as digital and analog communications links, as well as media storage and distribution systems developed in the future.

The above-discussed embodiments may be implemented by software modules that perform certain tasks. The software modules discussed herein may include script, batch, or other executable files. The software modules may be stored on a machine-readable or computer-readable storage medium such as a disk drive. Storage devices used for storing software modules in accordance with an embodiment of the invention may be magnetic floppy disks, hard disks, or optical discs such as CD-ROMs or CD-Rs, for example. A storage device used for storing firmware or hardware modules in accordance with an embodiment of the invention may also include a semiconductor-based memory, which may be permanently, removably, or remotely coupled to a microprocessor/memory system. Thus, the modules may be stored within a computer system memory to configure the computer system to perform the functions of the module. Other new and various types of computer-readable storage media may be used to store the modules discussed herein.

The above description is intended to be illustrative of the invention and should not be taken to be limiting. Other embodiments within the scope of the present invention are possible. Those skilled in the art will readily implement the steps necessary to provide the structures and the methods disclosed herein, and will understand that the process parameters and sequence of steps are given by way of example only and can be varied to achieve the desired structure as well as modifications that are within the scope of the invention. Variations and modifications of the embodiments disclosed herein can be made based on the description set forth herein, without departing from the scope of the invention. Consequently, the invention is intended to be limited only by the scope of the appended claims, giving full cognizance to equivalents in all respects.

What is claimed is:

1. A method comprising:
   identifying a plurality of secondary nodes;
   sending an update to each of the plurality of secondary nodes, wherein
      the update is sent from a primary node, and
      the update is an update to data in a region of a storage area;
   setting an indicator for the each of the plurality of the secondary nodes, wherein
      the setting causes the indicator to indicate that the update has been sent to the each of the plurality of secondary nodes;
   determining that a failure has occurred at the primary node; and
   in response to the determining, selecting a secondary node of the plurality of secondary nodes as a new primary node, wherein
      the selecting is based on the indicators for the each of the plurality of secondary nodes.

2. The method of claim 1, wherein
   the plurality of secondary nodes comprises all secondary nodes.

3. The method of claim 1, further comprising:
   in response to the sending, incrementing a regional counter stored on the primary node by a number of secondary nodes to which the update is sent, wherein
      the regional counter is a number of secondary nodes from which an acknowledgement to the update has not been received;
   in response to receiving an acknowledgement from a secondary node among the plurality of secondary nodes to which the update is sent, decrementing the regional counter;
   in response to the regional counter reaching a value prior to the incrementing, determining that all of the plurality of secondary nodes have acknowledged the update; and
   sending a notification to the each of the plurality of secondary nodes once all of the plurality of secondary nodes have acknowledged the update.

4. The method of claim 3, further comprising:
   setting a respective indicator in a respective region of a respective storage area at one of the plurality of secondary nodes when the update is received by the one secondary node; and
   resetting the respective indicator when the notification is received at the one secondary node.

5. The method of claim 4, further comprising:
   synchronizing first data in the respective region with second data in a second respective region of a second respective storage area at a second secondary node of the plurality of secondary nodes when at least one of the respective indicator and a second respective indicator for the second respective region is set.

6. The method of claim 5, wherein
the synchronizing does not affect third data in a third region of the second respective storage area when the respective indicator is not set and a third respective indicator for the third respective region is not set.

7. The method of claim 4, further comprising:
synchronizing first data in the respective region with second data in a second respective region of a second respective storage area at the secondary node selected as the new primary node wherein
at least one of the respective indicator and a second respective indicator for the second respective region is set.

8. The method of claim 3, wherein the setting further comprises:
setting a sent indicator for the region for the each of the plurality of secondary nodes when the update is sent to the each of the plurality of secondary nodes.

9. The method of claim 8, further comprising:
setting a received indicator for the region for the each of the plurality of secondary nodes when an acknowledgement of the update is received from the each of the plurality of secondary nodes.

10. The method of claim 9, wherein
the sending the notification to the each of the plurality of secondary nodes comprises determining that a respective sent indicator and a respective received indicator for the region are set for the each of the plurality of secondary nodes.

11. The method of claim 3, further comprising:
clearing a respective indicator for the region on one of the plurality of secondary nodes when the one secondary node receives the notification.

12. The method of claim 1, wherein
the secondary node selected as the new primary node is the most recently updated secondary node of the plurality of secondary nodes.

13. The method of claim 1, further comprising:
identifying a second update, wherein
the second update is an update to second data in a second region of a second storage area at the new primary node; and
in response to the identifying the second update, synchronizing the second data in the second region with third data in a third respective region of a third storage area at each of the remaining secondary nodes of the plurality of secondary nodes.

14. A non-transitory computer-readable storage medium comprising computer-readable instructions, wherein the computer-readable instructions, when executed by a processor, are configured to perform a method comprising:
identifying a plurality of secondary nodes;
sending an update to each of the plurality of secondary nodes, wherein
the update is sent by a primary node, and
the update is an update to data in a region of a storage area;
setting an indicator for the each of the plurality of secondary nodes, wherein
the setting causes the indicator to indicate that the update has been sent to the each of the plurality of secondary nodes;

determining that a failure has occurred at the primary node; and
in response to the determining, selecting a secondary node of the plurality of secondary nodes as a new primary node, wherein
the selecting is based on the indicators for the each of the plurality of secondary nodes.

15. The non-transitory computer-readable storage medium of claim 14, wherein the method further comprises:
in response to the sending, incrementing a regional counter stored on the primary node by a number of secondary nodes to which the update is sent, wherein
the regional counter is a number of secondary nodes from which an acknowledgement to the update has not been received;
in response to receiving an acknowledgement from a secondary node among the plurality of secondary nodes to which the update is sent, decrementing the regional counter;
in response to the regional counter reaching a value prior to the incrementing, determining that all of the plurality of secondary nodes have acknowledged the update; and
sending a notification to the each of the plurality of secondary nodes once all of the plurality of secondary nodes have acknowledged the update.

16. The non-transitory computer-readable storage medium of claim 15, wherein the method further comprises:
setting a respective indicator in a respective region of a respective storage area at one of the plurality of secondary nodes when the update is received by the one secondary node; and
resetting the respective indicator when the notification is received at the one secondary node.

17. The non-transitory computer-readable storage medium of claim 14, wherein the method further comprises:
synchronizing first data in the respective region with second data in a second respective region of a second respective storage area at a second secondary node of the plurality of secondary nodes when at least one of the respective indicator and a second respective indicator for the second respective region is set.

18. The non-transitory computer-readable storage medium of claim 17, wherein
the synchronizing does not affect third data in a third region of the second respective storage area when the respective indicator is not set and a third respective indicator for the third respective region is not set.

19. The non-transitory computer-readable storage medium of claim 14, wherein
the secondary node selected as the new primary node is the most recently updated secondary node of the plurality of secondary nodes.

20. The non-transitory computer-readable storage medium of claim 14, wherein the method further comprises:
identifying a second update, wherein
the second update is an update to second data in a second region of a second storage area at the new primary node; and
in response to the identifying the second update, synchronizing the second data in the second region with third data in a third respective region of a third storage area at each of the remaining secondary nodes of the plurality of secondary nodes.

21. A computer system comprising:
one or more processors;
a non-transitory computer-readable storage medium coupled to said one or more processors; and
a plurality of instructions, wherein
said plurality of instructions are encoded in said non-transitory computer-readable storage medium, and
said plurality of instructions, when executed by said one or more processors, are configured to perform a method comprising
identifying a plurality of secondary nodes,
sending an update to each of the plurality of secondary nodes, wherein
the update is sent from a primary node, and
the update is an update to data in a region of a storage area,
setting an indicator for the each of the plurality of secondary nodes, wherein
the setting causes the indicator to indicate that the update has been sent to the each of the plurality of secondary nodes,
determining that a failure has occurred at the primary node, and
in response to the determining, selecting a secondary node of the plurality of secondary nodes as a new primary node, wherein
the selecting is based on the indicators for the each of the plurality of secondary nodes.

22. The computer system of claim 21, wherein the method further comprises:
incrementing a regional counter stored on the primary node by a number of secondary nodes to which the update is sent, in response to the sending, wherein
the regional counter is a number of secondary nodes from which an acknowledgement to the update has not been received,
decrementing the regional counter in response to receiving an acknowledgement from a secondary node among the plurality of secondary nodes to which the update is sent,
determining that all of the plurality of secondary nodes have acknowledged the update, in response to the regional counter reaching a value prior to the incrementing, and
sending a notification to each of the plurality of secondary nodes once all of the plurality of secondary nodes have acknowledged the update.

23. The computer system of claim 22, wherein the method further comprises:
setting a respective indicator in a respective region of a respective storage area at one of the plurality of secondary nodes when the update is received by the one secondary node, and
resetting the respective indicator when the notification is received at the one secondary node.

24. The computer system of claim 23, wherein the method further comprises:
synchronizing first data in the respective region with second data in a second respective region of a second respective storage area at a second secondary node of the plurality of secondary nodes when at least one of the respective indicator and a second respective indicator for the second respective region is set.

25. The computer system of claim 24, wherein
the synchronizing does not affect third data in a third region of the second respective storage area when the respective indicator is not set and a third respective indicator for the third respective region is not set.

26. The computer system of claim 21, wherein
the secondary node selected as the new primary node is the most recently updated secondary node of the plurality of secondary nodes.

27. The computer system of claim 21, wherein the method further comprises:
identifying a second update, wherein
the second update is an update to second data in a second region of a second storage area at the new primary node, and
synchronizing the second data in the second region with third data in a third respective region of a third storage area at each of the remaining secondary nodes of the plurality of secondary nodes, in response to the identifying the second update.

* * * * *